United States Patent
Yamane et al.

[11] Patent Number: 6,158,172
[45] Date of Patent: Dec. 12, 2000

[54] WEATHERSTRIP

[75] Inventors: Tadanao Yamane; Toru Abo, both of Hiroshima, Japan

[73] Assignee: Nishikawa Rubber Co., Ltd., Hiroshima, Japan

[21] Appl. No.: 09/146,953

[22] Filed: Sep. 4, 1998

[30] Foreign Application Priority Data

Sep. 9, 1997 [JP] Japan ................................. 9-244165

[51] Int. Cl.[7] ..................................................... E06B 7/16
[52] U.S. Cl. ............................................................ 49/489.1
[58] Field of Search ............................... 49/475.1, 489.1, 49/498.1

[56] References Cited

U.S. PATENT DOCUMENTS

| | | | |
|---|---|---|---|
| 4,010,573 | 3/1977 | Andrzejewski | 49/498.1 X |
| 4,542,610 | 9/1985 | Weimar | 49/498.1 X |
| 4,628,639 | 12/1986 | Lownsdale | 49/498.1 |
| 4,858,385 | 8/1989 | Bright | 49/498.1 X |
| 5,111,617 | 5/1992 | Saiga | 49/475.1 X |

FOREIGN PATENT DOCUMENTS

| | | | |
|---|---|---|---|
| 5-517 | 1/1993 | Japan | B60J 10/08 |
| 8-72100 | 3/1996 | Japan | B29C 45/14 |

*Primary Examiner*—Jerry Redman
*Attorney, Agent, or Firm*—Sughrue, Mion, Zinn, Macpeak & Seas, PLLC

[57] ABSTRACT

A weatherstrip for sealing the corner and its vicinities of an automotive door, which comprises: an extruded weatherstrip which comprises: a base that contains a relatively narrow hollow portion and is to be fixed into a retainer; and a hollow tubular seal protruding from the base toward the body panel; and a molded weatherstrip integrally molded with the extruded weatherstrip, which comprises: a flat base having a substantially uniform thickness; and a hollow tubular seal protruding from the base toward the body panel, wherein the molded weatherstrip has a tabular insert panel comprising a tip portion and the other portion, for integrally molding the molded weatherstrip with the extruded weatherstrip, so that the tip portion is fitted into the hollow portion of the base of the extruded weatherstrip and the other portion is enclosed in the base of the molded weatherstrip.

9 Claims, 5 Drawing Sheets

WEATHERSTRIP

FIELD OF THE INVENTION

This invention relates to a weatherstrip for sealing the periphery of an automotive door, particularly to a molded weatherstrip applied to the corner and the vicinities thereof of the door.

BACKGROUND OF THE INVENTION

A representative conventional weatherstrip obtained by molding in a mold (hereinafter simply referred to as a "molded weatherstrip") that is applied to the corner of an automotive door is shown in FIG. 5 through FIG. 9, while the details such as the curvature radius, total length, method of fixing, and the like somewhat vary depending on whether the door is of a sash type or a panel type. To take an instance, application of the panel type to the upper, center-pillar side corner of a front door is illustrated.

FIG. 5 is a plan view of a front door FR of panel type, seen from the outside of the car. The upper part of the front door FR above the belt line J—J is also composed of an outer panel and an inner panel shaped by press working integrally with the main part of the door. Retainers RT for fixing a weatherstrip, which are indicated by dotted line in FIG. 5, come to an end in front of the upper, center-pillar side corner so that the weatherstrip is not fixed at this corner (hereinafter called "unfixed area").

FIG. 6 is a cross sectional view of the front door FR, taken along the line A—A shown in FIG. 5. An inner panel IP is welded to an outer panel OP. A retainer RT is welded to the inner panel IP along the periphery thereof above the belt line, into which a relatively long extrusion-molded weatherstrip (hereinafter referred to as an "extruded weatherstrip") is fitted. A sash GS for glass run is welded to the outer panel OP along the periphery thereof above the belt line which defines an opening portion for a glass window.

Shaped by press working, the front door FR has a considerably larger curvature radius at the corner than that of a sash type door. Therefore, the unfixed area inclusive of a straight portion is longer than that of a sash door. In some designs a retainer RT is not at all provided on the center pillar side and, instead, other means, such as a clip, is used for fixing the weatherstrip.

Even in a sash door that could be designed to have a complicated bend with a relatively small curvature at the corner, an unfixed area is unavoidably produced at the corner.

Hence, various manipulations have ever been proposed for fixing a molded weatherstrip.

As is apparent from FIGS. 7 to 9, an extruded weatherstrip 1 and a molded weatherstrip 10 have conventionally been connected at a joint portion $WL_1$ as follows. A mold (not shown) containing a core $CR_1$ shown in FIG. 9 is used. One end of the previously extruded weatherstrip 1 is inserted to the end of the mold to be fitted with the mold via the core $CR_1$. A tabular insert panel $INP_1$ is then set in the mold at the position corresponding to a base 11 of a weatherstrip 10. A molding material is inserted to be molded using the thus prepared mold to obtain a molded weatherstrip 10 having a desired shape and, at the same time, to join the weatherstrips 1 and 10 into one integral body.

The extruded weatherstrip 1 and the molded weatherstrip 10 thus joined have almost the same cross sectional shape except for their bases. The extruded weatherstrip 1 comprises: a base 2 which has a relatively narrow hollow portion 3 and which is to be fixed into the retainer RT; a hollow tubular seal 4 which protrudes from the base 2 toward the body panel; a first seal lip 5 which extends from the side of the hollow tubular seal 4 facing inside the car toward inside the car; and a second seal lip 6 which extends from the side of the hollow tubular seal 4 facing outside the car toward outside the car and which is to seal the back side the panel door.

On the other hand, the molded weatherstrip 10 comprises: a base 11 which completely encloses the tabular insert panel $INP_1$ and which has an almost flat shape so that it may be easily removed from the mold; a hollow tubular seal 12 protruding from the base 11 toward the body panel; a first seal lip 13 extending from the hollow seal 12 toward inside the car; and a second seal lip 14 extending from the hollow seal 12 toward outside the car and sealing the back side of the panel door.

The core $CR_1$ has a subcore SCR that is fitted into the hollow portion 3. The root of the subcore SCR connecting to the main portion of the core $CR_1$ has its rear side sloped. This slope gives a difference h in wall thickness of the base 11 of the molded weatherstrip 10 at the tip thereof as shown in FIG. 8. As a result, the base 11 of the molded weatherstrip 10 has a tapered end in the vicinity of the joint portion $WL_1$. That is, the base 11 very near to the joint portion $WL_1$ is thin-walled as compared with the thickness at the tip of the tabular insert panel $INP_1$.

Because the tabular insert panel $INP_1$ should extend to the position where the retainer RT exists so as to prevent penetration of water, the conventional molded weatherstrip 10 includes a long straight portion as well as a curved portion and therefore has a long overall length. Therefore, the molding material tends to reduce its flowability while flowing through such a long mold, resulting in deteriorated quality. An additional problem of the conventional weatherstrip is that the thin-walled portion of the base 11 in the vicinity of the joint portion $WL_1$, which results from the level difference h at the rear of the subcore SCR, has caused reductions in joint strength and watertightness at that portion.

SUMMARY OF THE INVENTION

An object of the present invention is to solve the above-mentioned problems associated with the conventional techniques relating to weatherstrips and to provide a weatherstrip excellent in ease in molding, molding cost, adhesive strength at the joint, and in sealing performance.

Other objects and effects of the invention will become apparent from the following description.

The above objects of the present invention have been achieved by providing a weatherstrip comprising:

an extruded weatherstrip which comprises:
  a base that contains a relatively narrow hollow portion and is to be fixed into a retainer; and
  a hollow tubular seal protruding from said base toward the body panel; and a molded weatherstrip integrally molded with said extruded weatherstrip, which comprises:
  a flat base having a substantially uniform thickness; and
  a hollow tubular seal protruding from said base toward the body panel, wherein said molded weatherstrip has a tabular insert panel comprising a tip portion and the other portion, for integrally molding said molded weatherstrip with said extruded weatherstrip, so that said tip portion is fitted into said hollow portion of the base of said extruded weatherstrip and said the other portion is enclosed in the base of said molded weatherstrip.

In a preferred embodiment of the weatherstrip according to the present invention, said tabular insert panel has a projection which contacts the end surface of the base of the extruded weatherstrip.

In another preferred embodiment of the weatherstrip according to the present invention, said tabular insert panel is substantially straight in the vicinities of said tip portion thereof (i.e., the portion fitted into the hollow portion 3) and is curved in the other portion.

The invention also relates to a method for producing a weatherstrip comprising an extruded weatherstrip and a molded weatherstrip integrally molded therewith, which comprises the steps of:

providing an extruded weatherstrip comprising:
  a base that contains a relatively narrow hollow portion and is to be fixed into a retainer; and
  a hollow tubular seal protruding from said base toward the body panel,
fitting the end of said extruded weatherstrip to one end of a mold for a weatherstrip via a core;
setting a tabular insert panel in said mold at the position corresponding to a base of the molded weatherstrip; and
introducing a molding material into the mold to form the weatherstrip integrally joined with the end of said extruded weatherstrip,
wherein said tabular insert panel comprises a tip portion and the other portion, and said tip portion is inserted into said relatively narrow hollow portion of the extruded weatherstrip at said setting step.

Furthermore, the invention also relates to a door having attached the weatherstrip and to a vehicle equipped with the weatherstrip.

According to the present invention, the whole length of the base of the molded weatherstrip, which is flat and substantially uniform in thickness, is adhered to around the corner of a panel door or a sash door with almost equal pressure, and the tip portion of the tabular insert panel which fills the narrow hollow portion of the extruded weatherstrip and which links with the base of the extruded weatherstrip increases the pressing force of the base of the extruded weatherstrip against the retainer. Because the base of the molded weatherstrip has a substantially uniform wall thickness, an adequate joint strength to the end of the extruded weatherstrip can be maintained.

Where the tabular insert panel has a projection which can contact the end surface of the base of the extruded weatherstrip, the joint between the molded weatherstrip and the extruded weatherstrip is positioned with accuracy, and the tight fit of the tip portion of the insert panel into the narrow hollow portion of the extruded weatherstrip can be ensured.

Where the tabular insert panel is substantially straight in the vicinities of the tip portion thereof and is curved in the other portion, the requisite total length of the molded weatherstrip can be reduced. As a result, the moldability is improved.

PREFERRED EMBODIMENTS OF THE INVENTION

Embodiments of the weatherstrip according to the present invention is described below by referring to the accompanying drawings.

Figure 1:
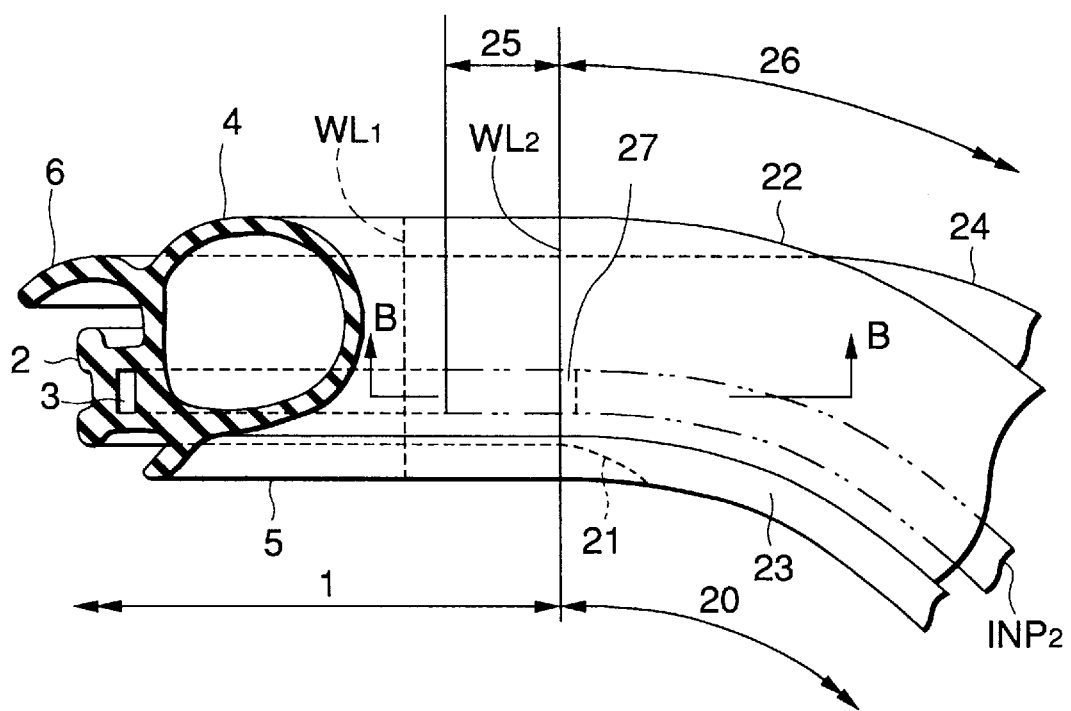
FIG. 1 is a partial cutaway side view of the structure of one embodiment of the weatherstrip according to the present invention at the joint portion between a molded weatherstrip and an extruded weatherstrip.
Figure 2:
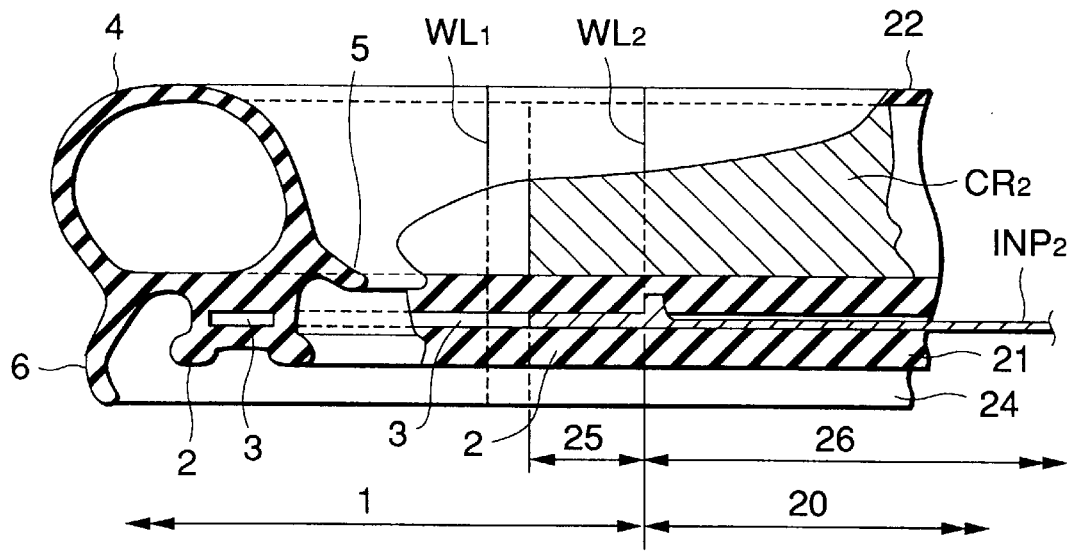
FIG. 2 is another partial cutaway side view of the weatherstrip of FIG. 1 from a different side with the side cut away along the line B—B in FIG. 1, showing the structure at the joint portion between a molded weatherstrip and an extruded weatherstrip.
Figure 3:
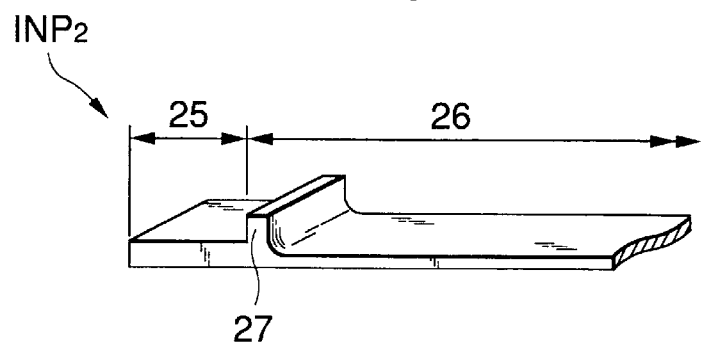
FIG. 3 is a perspective view of a tabular insert panel of FIGS. 1 and 2.
Figure 4:
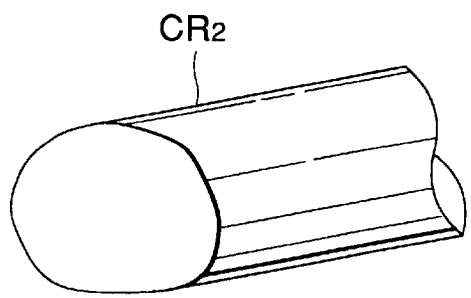
FIG. 4 is a perspective view of a core used in molding the molded weatherstrip of FIGS. 1 and 2.
Figure 5:
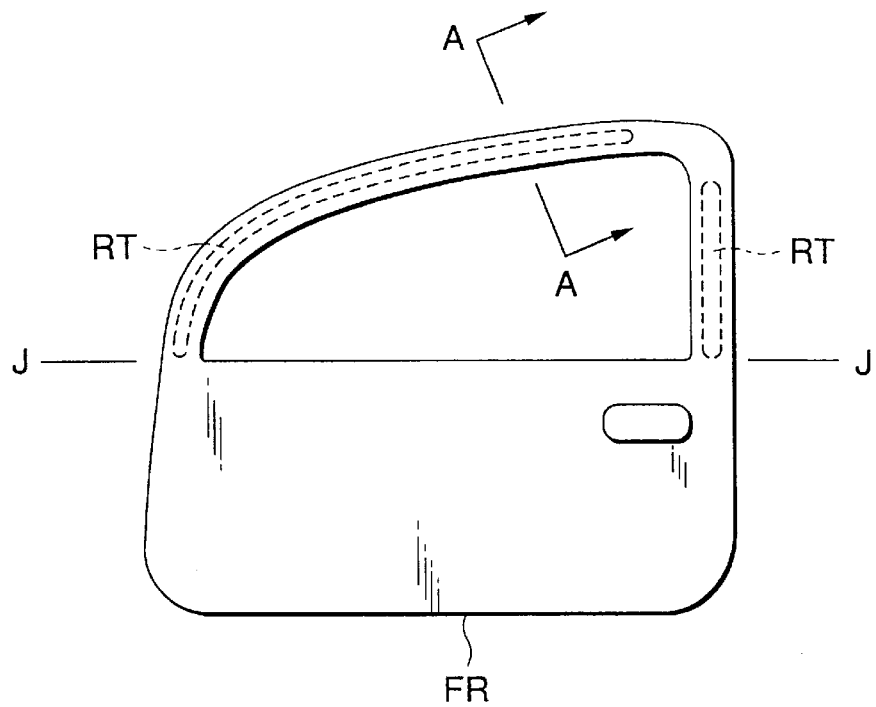
FIG. 5 is a plan view of an automotive front panel door from the outside.
Figure 6:
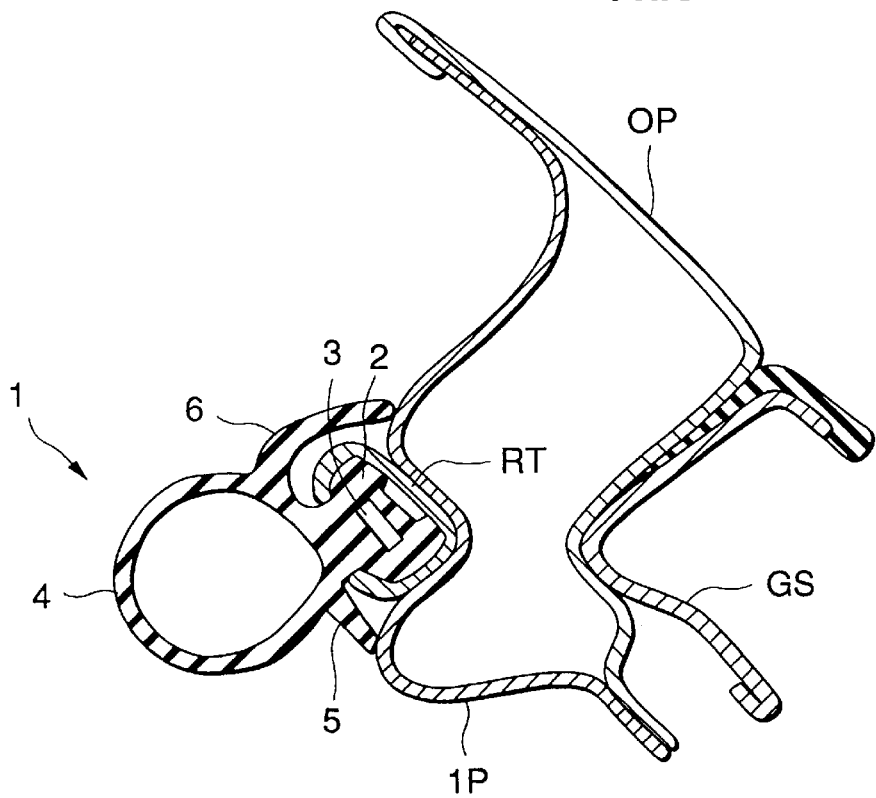
FIG. 6 is a cross-sectional view of the front door of FIG. 5 taken along the line A—A.
Figure 7:
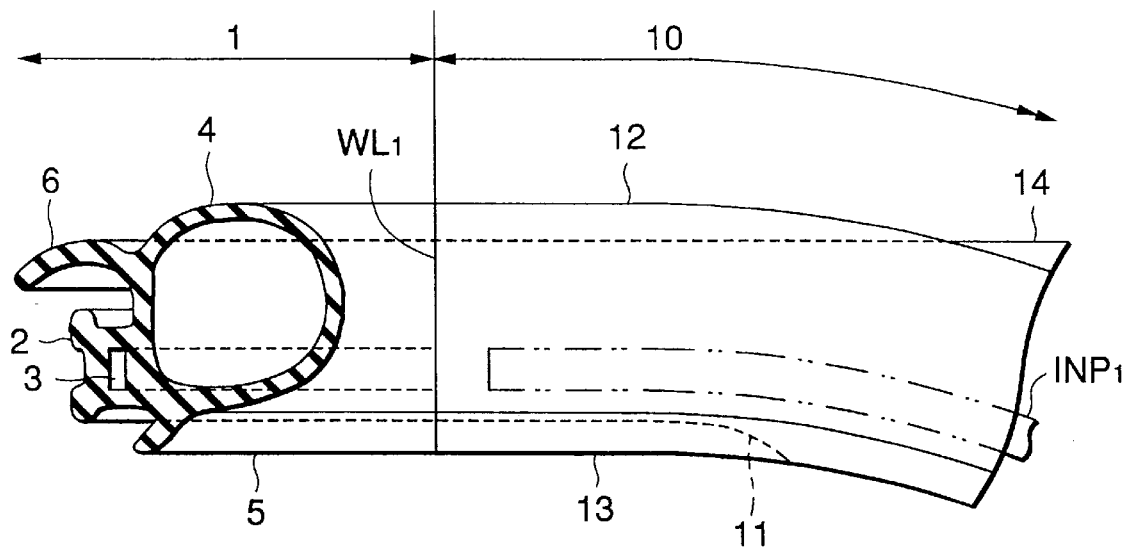
FIG. 7 is a partial cutaway side view of a conventional weatherstrip.
Figure 8:
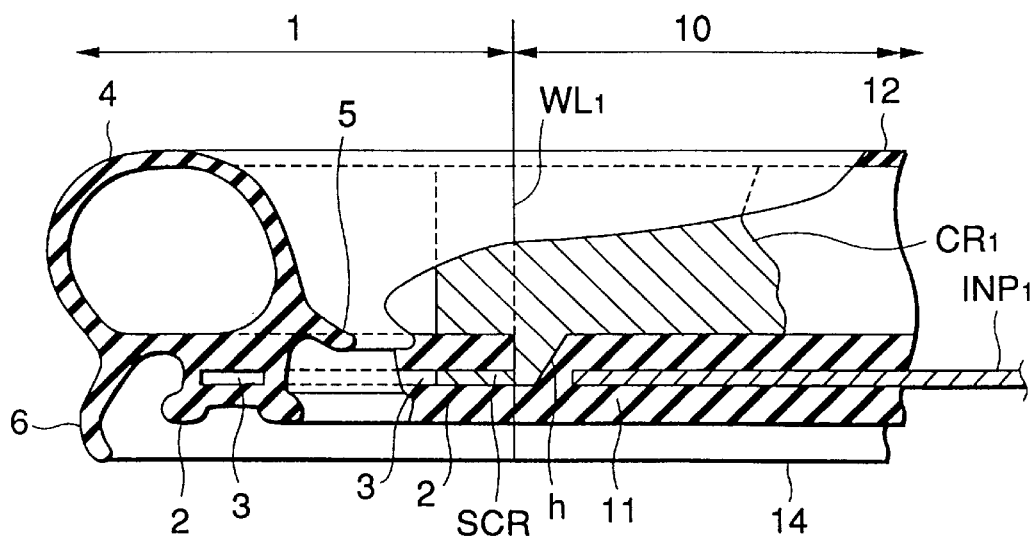
FIG. 8 is another partial cutaway side view of the conventional weatherstrip of FIG. 7, showing the structure of the joint portion between a molded weatherstrip and an extruded weatherstrip.
Figure 9:
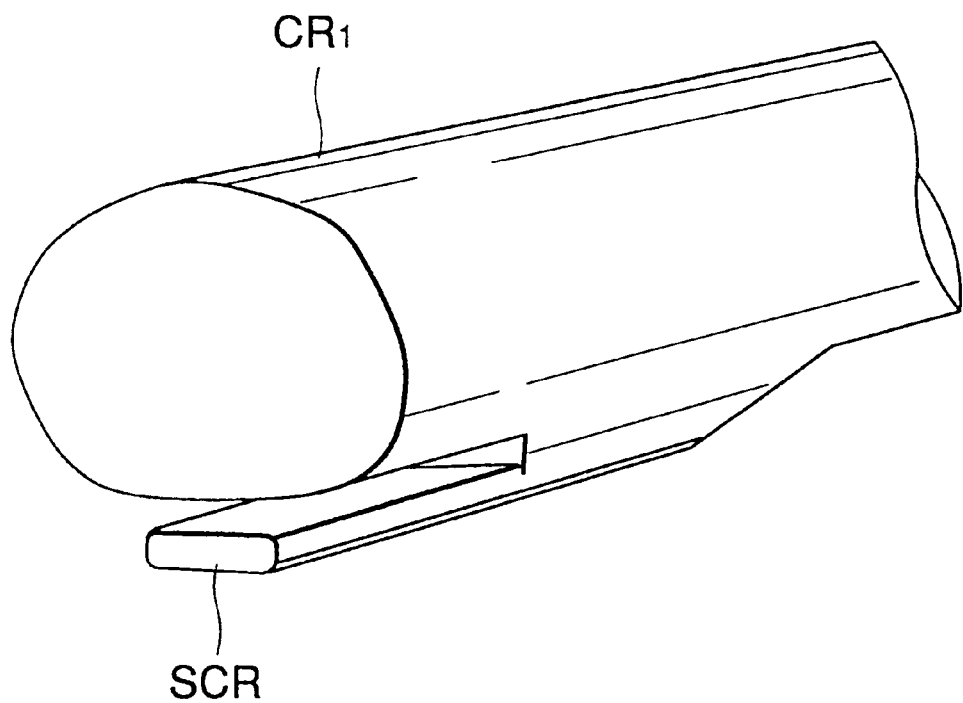
FIG. 9 is a perspective view of a core used in molding the molded weatherstrip of FIGS. 7 and 8.

FIGS. 1 and 2 are partial cutaway side views of the weatherstrip of the present invention, showing the structure in the vicinities of the joint portion $WL_2$ between a molded weatherstrip 20 and an extruded weatherstrip 1. FIG. 3 is a perspective view of a tabular insert panel $INP_2$ shown in FIGS. 1 and 2. FIG. 4 is a perspective view of a core $CR_2$ used in molding for production of the molded weatherstrip 20.

While the embodiments will be described with particular reference to the application to the upper corner of a front panel door on the side near the center pillar as has been described above in relation to the conventional weatherstrips, the present invention is by no means limited to this application and is applicable to the upper corners of front and rear sash doors.

As is shown in FIGS. 1 and 2, the extruded weatherstrip 1 and the molded weatherstrip 20 are joined (at the joint portion $WL_2$) by fitting the end of the extruded weatherstrip 1 to one end of a mold (not shown) via the core $CR_2$, setting a tabular insert panel $INP_2$ in the mold at the position corresponding to a base 21 of the molded weatherstrip, and introducing a molding material into the mold to form the weatherstrip 20 integrally joined with the end of the extruded weatherstrip 1.

As shown in FIG. 4, the core $CR_2$ is a simple columnar core having an elliptical section just for defining the inner surface of hollow tubular seals 4 and 22.

The joined extruded weatherstrip 1 and molded weatherstrip 20 have substantially the same cross sectional shape except for their bases. The extruded weatherstrip 1 comprises: a base 2 which has a relatively narrow hollow portion 3 and which is to be fixed into the retainer RT; a hollow tubular seal 4 which protrudes from the base 2 toward the body panel; a first seal lip 5 which extends from the side of the hollow seal 4 facing inside the car toward inside the car; and a second seal lip 6 which extends from the side of the hollow seal 4 facing outside the car toward outside the car and which is to seal the back side the panel door.

On the other hand, the molded weatherstrip 20 comprises: a base 21 which completely encloses the tabular insert panel $INP_1$ and which has an almost flat shape so that it may be easily parted from the mold; a hollow tubular seal 22 protruding from the base 21 toward the body panel; a first seal lip 23 extending from the hollow seal 22 toward inside [th]e car; and a second seal lip 24 extending from the hollow seal 22 toward outside the car and sealing the back side of the panel door.

The tip portion 25 of the tabular insert panel $INP_2$ is inserted into the hollow portion 3 of the base 2 of the extruded weatherstrip 1 with the other portion 26 being [en]closed in the base 21 of the molded weatherstrip 20. The tabular insert panel $INP_2$ is preferably made of synthetic resins, such as polyamide 6,6 containing 43% by weight of glass fiber. The tip portion 25 of the tabular insert panel $INP_2$ should have a thickness enough to fill the hollow portion 3, and the thickness of the other portion 26 is the same as or smaller than that of the tip portion 25.

According to the above structure, the whole length of the base 21 of the molded weatherstrip 20 can be adhered to around the corner of a panel door with almost equal pressure, and the tip portion 25 of the tabular insert panel $INP_2$ which fills the narrow hollow portion 3 of the base 2 of the extruded weatherstrip 1 increases the pressing force of the base 2 against the retainer RT. Because the base 21 of the molded weatherstrip 20 has a substantially uniform wall thickness, an adequate joint strength to the end of the extruded weatherstrip 1 can be maintained.

In a preferred embodiment, the tabular insert panel $INP_2$ can have a projection 27 at the border between the tip portion 25 and the other portion 26 so that the projection 27 can contact the end of the base 2 of the extruded weatherstrip 1. In this embodiment, the joint between the molded weatherstrip 1 and the extruded weatherstrip 20 is positioned with accuracy, and the tight fit of the tip portion 25 of the insert panel $INP_2$ into the narrow hollow portion 3 of the extruded weatherstrip 1 can be ensured.

In another modified embodiment, the tabular insert panel $INP_2$ can have its tip portion 25 substantially straightened and have the other portion 26 curved. In this embodiment, the total length of the molded weatherstrip 20 can be reduced. As a result, the moldability is improved. Even if the length of the tip portion 25 of about 30 mm, it can adequately give its function.

The present invention produces the following noticeable effects. According to the basic structure of the weatherstrip of the present invention, the whole length of the base 21 of the molded weatherstrip 20 can be adhered to around the corner of a panel door or a sash door with almost equal pressure. Because the tip portion 25 of the tabular insert panel $INP_2$ fills the narrow hollow portion 3 of the base 2 of the extruded weatherstrip 1, the pressing force of the base 2 against the retainer RT can be increased. The uniform wall thickness of the base 21 of the molded weatherstrip 20 makes it possible to maintain an adequate joint strength to the end of the extruded weatherstrip 1.

According to the modified structure in which the tabular insert panel $INP_2$ has a projection 27 contacting the end of the base 2 of the extruded weatherstrip 1, the joint between the molded weatherstrip 1 and the extruded weatherstrip 20 is positioned with accuracy, and the tight fit of the tip portion 25 of the insert panel $INP_2$ into the narrow hollow portion 3 of the extruded weatherstrip 1 can be ensured.

According to another modified structure in which the tabular insert panel $INP_2$ has its tip portion 25 substantially straightened and has the other portion 26 curved, the total length of the molded weatherstrip 30 can be reduced, making it feasible to provide a weatherstrip excellent in the moldability, molding cost, joint strength, and sealing tightness.

While the invention has been described in detail and with reference to specific examples thereof, it will be apparent to one skilled in the art that various changes and modifications can be made therein without departing from the spirit and scope thereof.

What is claimed is:

1. A weatherstrip comprising:
    an extruded weatherstrip which comprises:
        a base that contains a relatively narrow hollow portion and is to be fixed into a retainer; and
        a hollow tubular seal protruding from said base toward a body panel; and
    a molded weatherstrip integrally molded with said extruded weatherstrip, which comprises:
        a flat base having a substantially uniform thickness; and
        a hollow tubular seal protruding from said base toward the body panel,
        wherein said molded weatherstrip having a tabular insert panel comprising a tip portion and an other portion, which integrally molds said molded weatherstrip with said extruded weatherstrip, so that said tip portion is fitted into said hollow portion of the base of said extruded weatherstrip and the other portion is enclosed in the base of said molded weatherstrip said tabular insert panel has a projection disposed between said tip portion and the other portion, and
        wherein the tip portion has a thickness sufficient to fit within the hollow portion of the base of the extruded weatherstrip.

2. The weatherstrip according to claim 1, wherein said projection contacts an end surface of the base of said extruded weatherstrip.

3. The weatherstrip according to claim 1, wherein said tip portion of the tabular insert panel has a substantially straight shape and said the other portion of the tabular insert panel has a curved shape.

4. The weatherstrip according to claim 3, wherein said tip portion of the tabular insert panel has a length of 30 mm.

5. The weatherstrip according to claim 1, said tabular insert panel comprises polyamide 6,6 containing 43% by weight of glass fiber.

6. An automotive door having attached a joined weatherstrip comprising:
    an extruded weatherstrip which includes:
        a base that contains a relatively narrow hollow portion and is to be fixed into a retainer; and
        a hollow tubular seal protruding from said base toward a body panel; and
    a molded weatherstrip integrally molded with said extruded weatherstrip, which includes:
        a flat base having a substantially uniform thickness; and
        a hollow tubular seal protruding from said base toward the body panel,
    wherein said molded weatherstrip having a tabular insert panel comprising a tip portion and an other portion, which integrally molds said molded weatherstrip with said extruded weatherstrip, so that said tip portion is fitted into said hollow portion of the base of said extruded weatherstrip and the other portion is enclosed in the base of said molded weatherstrip said tabular insert panel has a projection disposed between said tip portion and the other portion, and wherein the tip portion has a thickness sufficient to fit within the hollow portion of the base of the extruded weatherstrip.

7. The automotive door according to claim 6, wherein said door is of a panel type.

8. The automotive door according to claim 6, wherein said door is of a sash type.

9. The automotive door according to claim 6 wherein the door is located on an automobile.

* * * * *